United States Patent [19]

Schneider et al.

[11] Patent Number: 5,366,937
[45] Date of Patent: Nov. 22, 1994

[54] OPTICAL FIBER COMPOSED OF GLASS DOPED WITH LASER-ACTIVE IONS OF AN ELEMENT FROM THE RARE EARTHS

[75] Inventors: Hartmut Schneider, Munich; Christian Gerndt, Geretsried; Armin Staudt, Munich, all of Germany

[73] Assignee: Siemens Aktiengesellschaft, Munich, Germany

[21] Appl. No.: 204,809

[22] Filed: Mar. 2, 1994

Related U.S. Application Data

[63] Continuation of Ser. No. 728,513, Jul. 11, 1991, abandoned.

[30] Foreign Application Priority Data

Sep. 11, 1990 [DE] Germany ............... 4028821

[51] Int. Cl.$^5$ ............... C03C 3/247; C03C 13/04
[52] U.S. Cl. ............... 501/40; 501/37; 385/142
[58] Field of Search ............... 501/40, 37; 385/142

[56] References Cited

U.S. PATENT DOCUMENTS

| | | | |
|---|---|---|---|
| 3,527,711 | 5/1967 | Barbar et al. | 501/54 |
| 3,599,106 | 8/1971 | Snitzer | 501/37 |
| 3,599,114 | 8/1971 | Snitzer et al. | 501/37 |
| 4,717,691 | 1/1988 | Lucas et al. | 501/37 |
| 4,962,995 | 10/1990 | Andrews et al. | 501/37 |

FOREIGN PATENT DOCUMENTS 2241949  9/1991  United Kingdom ............ C03C 3/32

OTHER PUBLICATIONS

"Rare-Earth-Doped Fiber Lasers & Amplifiers" by D. N. Payne et al, Proc. 14th Europ. Conf. Opt. Comm., Brighton, U.K. 1988, pp. 49–53. No month.

"Laser Pumping of Ho–, Tm–, Er–Doped Garnet Lasers at Room Temperature" by G. Huber et al, IEEE Journal of Quantum Electronics, vol. 24, No. 6, Jun. 1988, pp. 920–923.

"Spectra and Energy Levels of Rare Earth Ions in Crystals" by Gerhard Heinrich Dieke, Interscience Publishers, John Wiley & Sons, New York, London, Sydney, Toronto, Chapter 10, p. 134. 1968, no month.

*Primary Examiner*—Karl Group
*Assistant Examiner*—C. M. Bonner
*Attorney, Agent, or Firm*—Hill, Steadman & Simpson

[57] ABSTRACT

Optical fiber composed of a glass doped with at least laser-active ions of an element from the rare earths. An optical fiber of glass, preferably a HMF glass, doped with $Tm^{3+}$ is operated at 1.48 μm as a fiber laser or amplifier on the laser transition $^3F_4$-$^3H_4$. Since this thereby involves a self-saturating transition, the terminal level is emptied in accelerated fashion for a continuous wave mode by co-doping with de-activators, preferably $Ho^{3+}$, $Tb^{3+}$, $Eu^{3+}$ and/or $Pr^{3+}$ ions. The pump light wavelength can be selected from the wavelength range from 700 through 890 nm of GaAlAs emission. The optical fiber can be used in optical amplifiers or fiber amplifiers.

5 Claims, 2 Drawing Sheets

OPTICAL FIBER COMPOSED OF GLASS DOPED WITH LASER-ACTIVE IONS OF AN ELEMENT FROM THE RARE EARTHS

This is a continuation of application Ser. No. 07/728,513, filed Jul. 11, 1991, now abandoned.

BACKGROUND OF THE INVENTION

The present invention is directed to an optical fiber composed of glass doped with laser-active ions of an element from the group of rare earth elements.

Fibers of this type are disclosed in "Rare-earth-doped fiber lasers and amplifiers" by D. N. Payne et al., Proc. 14th Europ. Conf. Opt. Comm., Brighton, U.K. 1988, pages 49-53. With pumped light of pumped fiber lasers and fiber amplifiers, such fibers can be particularly used for optical transmission links, for example submarine cables, as well as, local optical networks.

A three level $Er^{3+}$ fiber laser is excellently suited for a transmission window at a wavelength $\lambda = 1.5$ $\mu m$ and is preferably used for long-distance transmission in optical communications technology. This laser is well suited not only in terms of the wavelength but also because of its high gain in a silica glass host material.

For laser gain in a three level system, however, a significant part of the ions must be kept in the upper laser level. This produces the disadvantage that pump light is used due to absorption out of this level into one of the usually numerous, higher levels. This process also known as excited state absorption (ESA) limits the obtainable population inversion and additionally restricts the selection of pump wavelengths that is already limited. In particular, the use of high-performance laser diodes of GaAlAs does not come into consideration for the excitation by beaming light into the 800 nm band of the $Er^{3+}$.

SUMMARY OF THE INVENTION

It is an object of the present invention to provide an optical fiber of the type initially cited that can laser-amplify optical signals with a wavelength in the transmission window at 1.5 $\mu m$ given a pump wavelength of 700 through 890 nm that falls in the wavelength range of GaAlAs emission.

The object of the present invention is achieved by an optical fiber composed of a glass doped with laser-active ions of an element from the group of rare earths, wherein the ions are thulium ions.

Further advantageous developments of the present invention are as follows. The glass doped with thulium ions can be doped with ions of a different type that, compared to thulium, has a higher doping concentration and that has an energy term ($^5I_7$, $^7F_2$, $^7F_6$) that lies close to the level of the energy term $^3H_4$ of the thulium ions. The ions of this type have a close succession of relatively low energy terms ($^7F_3$ through $^7F_6$ given $Tb^{3+}$, $^7F_5$ through $^7F_0$ given $Eu^{3+}$) that effect a multiphonon emission. The ions of this type are selected from the group of Ho, Tb, Eu, Pr. The glass can be composed of an oxygen-free fluoride glass from the group of heavy metal fluoride glasses. Also, the glass can be composed of silica glass. The thulium doping concentration can be selected below 0.1 mol percent. The doping concentration of the ions of this type amounts to up to 50 times the thulium doping concentration.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
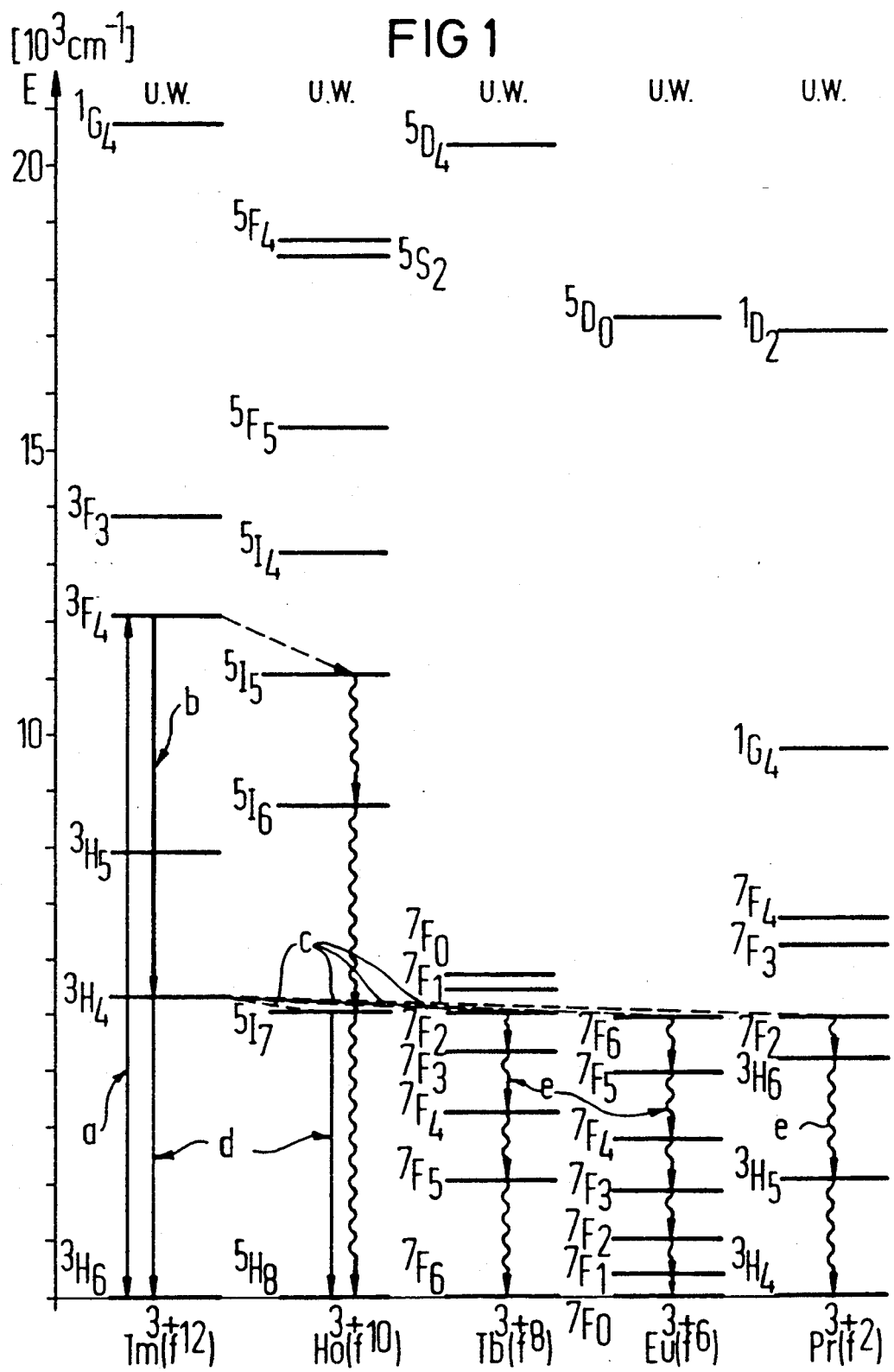
FIG. 1 is an energy level diagram depicting a side-by-side comparison of ions of different elements from the group of rare earth elements.

FIG. 1 depicts an energy level diagram for the ions $Tm^{3+}$, $Ho^{3+}$, $Tb^{3+}$, $Eu^{3+}$ and $Pr^{3+}$ in this sequence from left to right that is disclosed in the reference of G. H. Dieke, "Spectra and Energy Levels of Rare Earth Ions in Crystals", Interscience, New York, 1968, page 134.

The laser transitions $^3F_4$-$^3H_5$ having an emission at the wavelength 2.3 $\mu m$ and $^3H_4$-$^3H_6$ having an emission at the wavelength 1.8 $\mu m$ are well-known for the thulium ion $Tm^{3+}$ whereby it must be noted that some authors prefer the transposed allocation of the $^3F_4$ and $^3H_6$ conditions.

The transition $^3F_4$-$^3H_4$ can normally not be operated as a laser transmission since its terminal level (compared to the level lying thereabove) has a decay rate that is lower by approximately two orders of magnitude. The effect is due to the greater spacing to the next-lower condition that causes a lower multiphonon emission rate.

Russian researchers, however, have succeeded in forcing this transition $^3F_4$-$^3H_4$ in $Tm^{3+}$-doped $BaYb_2F_6$ or $LiYbF_4$ crystals by pumping with a Nd-YAG laser. Laser emission at a wavelength of 1.48 $\mu m$ was observed (see G. Huber et al., Laser Pumping of Ho-, Tm-, Er-doped Garnet Lasers at Room Temperature, IEEE J. Quant. Electron. 24 (6), 1988, pages 920-923).

The present invention is based on the novel approach that it is possible to also excite this transition in glass doped with $Tm^{3+}$ ions as activator ions and that it is possible to manufacture a usable fiber laser or amplifier for optical signals having a wavelength lying at 1.5 $\mu m$ with a fiber composed of such glass. This fiber laser or amplifier is capable of being pumped with the emission of a GaAlAs emission.

The $^3F_4$-$^3H_4$ transition is a self-saturating transition for $Tm^{3+}$, so that special measures must be undertaken in order to achieve a continuous wave laser mode.

As proceeds from IEEE J. Quantum Electron. 24 (6) 1988, pages 920 through 923, an emptying of the lower laser level by ESA of the pump light contributes to maintaining the population inversion, so that it is possible to empty the terminal level in an optical manner by emission of a suitable wavelength. In addition thereto, for example, it is well-known that absorption occurs rapidly in the presence of higher $Tm^{3+}$ concentrations for the inter-ionic energy transfer between $Tm^{3+}$ in the condition $^3H_4$ and $Ho^{3+}$ in the condition $^5I_7$ (this mechanism was variously utilized at $Ho^{3+}$ for stabilizing the laser transition $^5I_7$-$^5I_8$ at the emission wavelength 2.1

μm as disclosed in IEEE J. Quant. Electron.), so that, in addition to the optical deactivation, the deactivation by energy transfer to more energetically favorable terms of a co-doped, second ion type is possible.

Opposite the case of $Ho^{3+}$ ions, a de-activation of $Tm^{3+}$ ions present in low concentration in the condition $^3H_4$ is achieved in the fiber of the present invention by high concentrations with other ions, for example those of the rare earths. For example, a de-activation using $Ho^{3+}$ ions is possible. The comparatively long life of the acceptor condition $^5I_7$, however is a limiting factor for these ions. Moreover, a simultaneous even though inter-ionic energy transfer between $Tm^{3+}$ in the condition $^3F_4$ and $Ho^{3+}$ in the condition $^5I_5$ can reduce the population density of the laser level. More beneficial in comparison thereto is the use of $Tb^{3+}$, $Eu^{3+}$ and/or -$Pr^{3+}$ for which can be anticipated a high transfer rate in interaction with the $Tm^{3+}$ ions in the $^3H_4$ condition. These ions, particularly $Tb^{3+}$ have a close succession of low-lying energy levels that explains the rapid relaxation of this level by multiphoton emission. Given these ions, moreover, an injurious de-activation of the $^3F_4$ condition due to lack of suitable acceptor terms is impossible. A co-doping with two or more de-activators, for example with $Ho^{3+}$ and $Tb^{3+}$ ions, can also be advantageous for the purpose of combining the positive features of two or more ions, for example the rapid transfer rate of one ion type with the high relaxation rate of another ion type.

Silica glass is one host material used for the ions in the fiber of the present invention. The use of an oxygen-free fluoride glass from the group of heavy metal fluoride glasses (HMF glasses) is advantageous because this material group (due to its low phonon energies) is characterized by low multiphonon emission rates. Otherwise, a radiation-free de-activation of the transition $^3F_4$-$^3H_4$ competing with the laser transition would result. The thulium concentration is expediently selected below 1 mol percent in order to avoid a concentration quenching. This can be readily realized in fiber lasers without loss of pump power because the pump light coupled in via the end face is guided along the fiber. Particularly in HMF glass, the concentration of de-activator ions can be increased up to 50 times the concentration of activator ions or up to 5 mol percent because fluoride glass typically contains 4 through 5 mol percent $LaF_3$ that can be replaced by other fluorides of the rare earths.

In FIG. 1, reference character c indicates inter-ionic transitions between the term $^3H_4$ of $Tm^{3+}$ and the term $^5I_7$ of $Ho^{3+}$, the term $^7F_2$ of $Tb^{3+}$, the term $^7F_6$ of $Eu^{3+}$ or, respectively, the term $^7F_2$ of $Pr^{3+}$ that are indicated by broken lines. Reference character d indicates optical transitions between terms that are illustrated with straight-line arrows, whereas reference character e indicates phonon transitions between terms that are illustrated with wavy arrows. The close succession of low-lying terms is particularly noticeable in the case of $Tb^{3+}$ and $Eu^{3+}$, and effects a rapid relaxation of these terms due to the multiphonon emission produced by the numerous phonon transitions.

Figure 2:
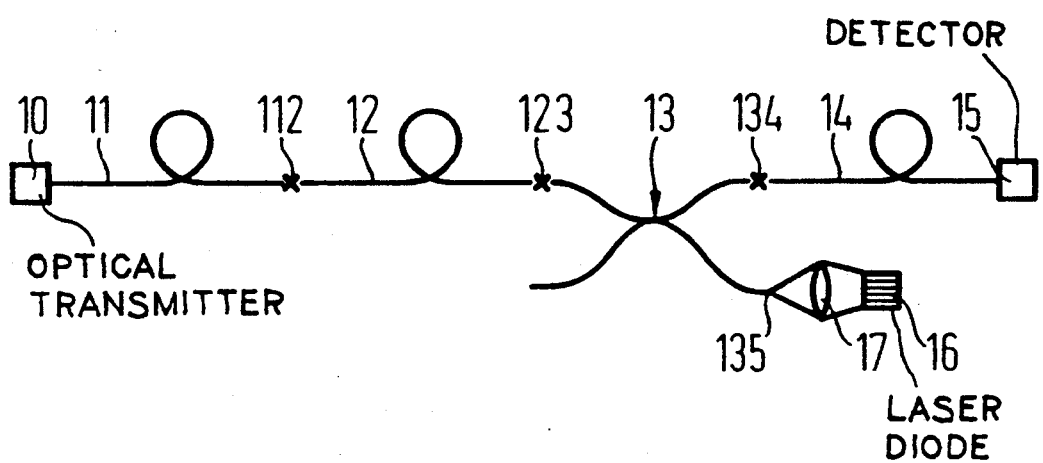
FIG. 2 is a schematic illustration of an optical signal transmission path having a fiber amplifier of the present invention inserted therein, for example spliced therein.

The optical signal transmission path shown in FIG. 2 and connecting an optical transmitter 10 to an optical detector 15 is composed of a fiber 11 for the transmission side, a fiber 12 of the present invention, an optical coupler 13 and a fiber 14 for the receiver side.

The fiber 11 for the transmission side is connected to the transmitter 10 and is connected to the fiber 12 of the present invention at location 112, for example by means of a butt coupling with immersion. The fiber 12 is connected at location 123 to a port on the transmitter side of the coupler 13. A port on the receive side of the coupler 13 is connected to the fiber 14 at location 134, the fiber 14 leading to the optical detector 15.

The optical transmitter transmits optical signals having a wavelength of approximately 1.5 μm that are transmitted to the receiver 15 the fiber 11, through the fiber 12, the coupler 13 and the fiber 14. The coupler 13 serves the purpose of coupling pump light having a wavelength λ in the wavelength range of 700 through 890 nm, for example 790 nm, into the fiber 12. This pump light is generated by a laser diode 16, for example by a multi-stripe laser diode, and is coupled in via a port of the coupler 13 at location 135, for example via an input optics 17. The pump light propagates in the transmission path opposite the optical signals conducted therein.

The coupler 13, for example, can be an optical fiber coupler or an integrated-optical directional coupler. In this case, the connections at 123 and 134 can also be butt couplings with immersion.

The fiber 12 serving as an amplifier is composed, for example, of MHF glass that is doped with $Tm^{3+}$ and $Tb^{3+}$.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An optical transmission fiber composed of an oxygen-free fluoride glass comprising a heavy metal fluoride glass, doped with less than 0.1 mol percent thulium ions and another rare earth ion selected from the group consisting of Ho, Tb, Eu and Pr, where the amount of the other rare earth ion is in a higher doping concentration on the order of up to 50 times higher and where the other rare earth ion has an energy term ($^5I_7$, $^7F_2$, $^7F_6$) that lies close to the level of an energy term $^3H_4$ of the thulium ions, such that said optical transmission fiber laser-amplifies, by a pump wavelength in a wavelength range of 700 to 890 nm, optical signals having a wavelength in a transmission window of the optical transmission fiber at 1.5 μm.

2. The optical transmission fiber according to claim 1, wherein the rare earth ion has a close succession of relatively low-lying energy terms ($^7F_3$ through $^7F_6$ given $Tb^{3+}$, $^7F_5$ through $^7F_0$ given $Eu^{3+}$) that effect a multi-phonon emission.

3. An optical transmission fiber composed of an oxygen-free fluoride glass comprising a heavy metal fluoride glass, doped with less than 0.1 mol percent thulium ions and another rare earth ion selected from the group consisting of Ho, Tb, Eu and Pr, said selected rare earth ion having a higher doping concentration on the order of up to 50 time higher, having an energy term that lies close to the level of an energy term of the thulium ions, and having a close succession of relatively low-lying terms that effect a multi-phonon emission, such that said optical transmission fiber laser-amplifies, by a pump wavelength in a wavelength range of 700 to 890 nm, optical signals having a wavelength in a transmission window of the optical transmission fiber at 1.5 μm.

4. A laser active glass fiber composed of an oxygen-free fluoride glass comprising a heavy metal fluoride glass, doped with less than 0.1 mol percent thulium ions and another rare earth ion selected from the group consisting of Ho, Tb, Eu and Pr, where the amount of the other rare earth ion is in a higher doping concentration on the order of up to 50 times higher and where the other rare earth ion has an energy term that lies close to the level of an energy term of the thulium ions, such that said laser active glass fiber laser-amplifies, by a pump wavelength in a wavelength range of 700 to 890 nm, optical signals having a wavelength in a transmission window of the laser active glass fiber at 1.5 $\mu$m.

5. The laser active glass fiber according to claim 4, wherein the rare earth ion has a close succession of relatively low-lying energy terms that effect a multi-phonon emission.

* * * * *